June 15, 1943.    R. W. JENNY    2,322,138
PISTON PIN RETAINER
Filed Nov. 12, 1941

INVENTOR
Robert W. Jenny.
BY
ATTORNEY

Patented June 15, 1943

2,322,138

UNITED STATES PATENT OFFICE 2,322,138

PISTON PIN RETAINER

Robert W. Jenny, New Milford, N. J., assignor to Wright Aeronautical Corporation, a corporation of New York Application November 12, 1941, Serial No. 418,672

9 Claims. (Cl. 85—8.5)

This invention relates to spring circlets of the type used for retaining piston pins against axial displacement in the pistons of internal combustion engines.

Spring circlets per se are old in the art and have comprised square or round spring wire or rings made from a helical spring, which are inserted after assembly of a piston pin into grooves formed in the walls of the piston bore. The present invention deals with improvements in spring circlets and has for a primary object provision of a circlet which may be made as a stamping from sheet metal stock. A further object is to provide a circlet which will require no special tools for installation or removal, which shall be capable of repeated use and which will have great resistance against fracture or displacement after proper installation. A further object is to provide a piston pin retainer which will be quite elastic in so far as installation and removal is concerned but which will have great resistance against displacement under the forces imposed upon it during engine operation.

Further objects will become apparent in reading the detailed description below in connection with the drawing, in which.

Figure 4:
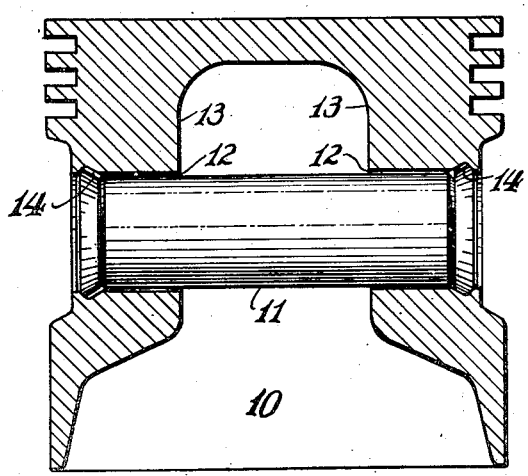
Fig. 4 is a section through a typical piston in which the retainer is adapted for use.
Figure 3:
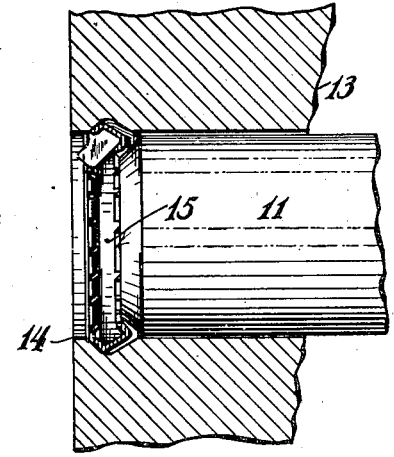
Fig. 3 is an enlarged detailed section of a portion of a piston and pin with the circlet installed.

Referring first to Fig. 4, I show a conventional piston 10 having a pin 11 assembled in bores 12 formed in piston pin bosses 13 integral with the piston. Said bores, toward their ends, have annular grooves 14 of more or less triangular shape. Fig. 3 shows part of the components above enumerated with a pin retaining circlet 15 installed in one of the grooves 14.

Figure 2:
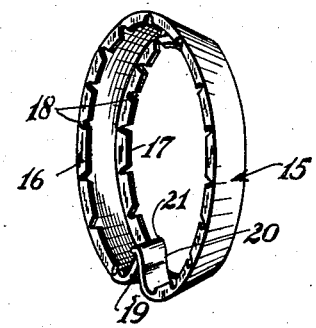
Fig. 2 is a perspective elevation of the completed circlet.

The complete circlet as shown in Fig. 2, is in the form of a conical frustum having inwardly projecting flanges 16 on its larger end and inwardly projecting flanges 17 at its smaller end, the flanges being cut away as at notches 18 to endow the circlet with considerable radial resilience. The ends of the circlet are turned inwardly as at 19 and 20, the portion 20 being reversely bent as at 21 to overlap the inner end of the projection 19.

Figure 1:
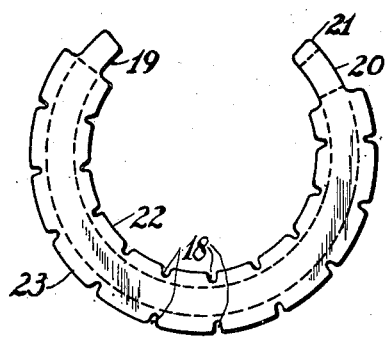
Fig. 1 is a plan of the basic stamping from which a circlet is formed.

Fig. 1 shows the basic flat stamping from which the circlet 15 is formed. This stamping is preferably produced from flat spring stock which is subsequently formed to the configuration of Fig. 2, the tabs 22 and 23 being bent along the dotted lines to form a channel section, the ends of the stamping also being bent to comprise the projections 19 and 20. After formation, the circlet may be heat-treated to secure the optimum elastic properties of the steel from which the circlet is fabricated.

In installing the circlet, the projections 19 and 20 are moved axially apart from one another and that end of the circlet adjacent the projection 19 is inserted in the piston groove 14, the circlet being then inserted progressively in the groove. Finally, the end of the circlet adjacent the projection 20 is placed in the groove and the projection portion 21 overhangs the projection 19. The flanges 17 bear against the end of the piston pin 11 while the flanges 16 bear against one side of the groove 14, thereby firmly securing the piston pin against axial displacement relative to the piston. Endwise force of the piston pin against the circlet merely serves to hold the circlet more firmly in the groove 14 and if there is no endwise force, inertia effects due to rapid reversals of piston reciprocation will have little or no tendency to displace the circlet from its groove.

It will be seen that this circlet may be made of comparatively thin-gauged sheet metal stock and that, since it is formed by simple stamping and rolling operations, its cost should be low.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A piston pin circlet for application to a groove of a piston pin bore, comprising a segmental member of spring material curved to comprise a conical frustum, the edges of the frustum having tabs bent inwardly to comprise abutments.

2. A piston pin circlet for application to a groove of a piston pin bore, comprising a segmental member of spring material curved to comprise a conical frustum, the ends of the member being inwardly bent and being in abutting relation to stiffen the circlet against deformation.

3. A spring circlet comprising a substantially annular member having uniform thickness and having a greater diameter at one end than at the other, and scalloped flanges extending inwardly from the ends of the circlet throughout its periphery.

4. A spring circlet comprising a substantially annular split channel member having its web portion defining a conical frustum, and having inwardly directed flanges at the two ends of the conical frustum.

5. A spring circlet comprising a substantially annular split channel member having its web portion defining a conical frustum, and having inwardly directed flanges at the two ends of the conical frustum, said flanges being parted at intervals throughout the circlet periphery to allow of spring action of the circlet web.

6. A spring circlet comprising a substantially annular split channel member having its web portion defining a conical frustum, and having inwardly directed flanges at the two ends of the conical frustum, the ends of said web portion being bent inwardly from the circlet periphery to comprise abutting tabs.

7. Locking means for retaining an element within a bore having an annular groove therein, comprising a split annular member shaped in the form of a conical frustum, said split frustum-shaped member being adapted to be sprung into said groove with its larger diameter engaging the outer edge of the groove and the smaller diameter operating to retain said element within the bore.

8. Locking means for retaining an element within a bore having an annular groove therein, comprising a split annular member shaped in the form of a conical frustum, each of the two ends of the conical frustum being formed with inturned flanges, said split frustum-shaped member being adapted to be sprung into said groove with its larger diameter and associated inturned flange engaging the outer edge of the groove and the smaller diameter with its associated inturned flange operating to retain said element within the bore.

9. Locking means for retaining a member within a bore comprising an annular split spring member adapted to be sprung into an annular groove within said bore, said annular member being formed from an initially flat arcuate stamping bent into the form of a conical frustum and having inturned flange means formed around the periphery of each of the two ends of said conical frustum.

ROBERT W. JENNY.